United States Patent [15] 3,672,231
Shinn et al. [45] June 27, 1972

[54] CLOSED-LOOP FLUIDIC ANALOG ACCELEROMETER

[72] Inventors: Jeffrey N. Shinn; Carl G. Ringwall, both of Scotia, N.Y.

[73] Assignee: General Electric Company

[22] Filed: July 18, 1969

[21] Appl. No.: 862,110

Related U.S. Application Data

[62] Division of Ser. No. 642,115, May 29, 1967.

[52] U.S. Cl. .................................................. 73/515
[51] Int. Cl. .............................................. G01p 15/02
[58] Field of Search ............... 73/515, 516, 514, 505; 137/81.5

[56] References Cited

UNITED STATES PATENTS

| | | | |
|---|---|---|---|
| 2,390,187 | 12/1945 | Sharpe | 73/517 UX |
| 3,042,343 | 7/1962 | Cooke et al. | 73/515 X |
| 3,044,305 | 7/1962 | Canfield | 73/516 X |
| 3,151,488 | 10/1964 | Tracy et al. | 73/517 R |
| 3,201,999 | 8/1965 | Byrd | 73/515 |
| 3,416,378 | 12/1968 | Evans et al. | 74/5.6 |
| 3,490,293 | 1/1970 | Evans | 73/515 |

FOREIGN PATENTS OR APPLICATIONS

| | | | |
|---|---|---|---|
| 669,829 | 1/1939 | Germany | 73/515 |

Primary Examiner—James J. Gill
Attorney—Arthur E. Fournier, Frank L. Neuhauser, Oscar B. Waddell, David M. Schiller and Joseph B. Forman

[57] ABSTRACT

Apparatus for sensing acceleration and generating an analog-type pressurized fluid signal proportional to the magnitude of the associated event. Linear acceleration as sensed by a flexure-mounted inertial mass including a hollow, elongated spring member of the cantilever beam type having a first end rigidly fixed in position and a second unsupported end upon which the acceleration-sensitive inertial mass is mounted. The hollow portion of the spring member issues a fluid jet from the second unsupported end directed at fluid receivers, the flexure of the spring member causing distribution of the jet between the receivers in proportion to the magnitude of the acceleration. Fluid amplifier circuitry provides high gain and stabilization in the loop comprising the spring-mass device, receivers, fluid amplifier circuitry and a negative feedback circuit to obtain closed-loop null-type operation producing insensitiveness to changes in pressure of the fluid supplied to the hollow spring member. Angular motion acceleration is sensed by utilizing a cylindrical inertial mass connected along its longitudinal axis to two torsional spring members rigidly fixed in position at their far ends such that the cylindrical mass is subject to rotation in the presence of an angular motion acceleration.

4 Claims, 9 Drawing Figures

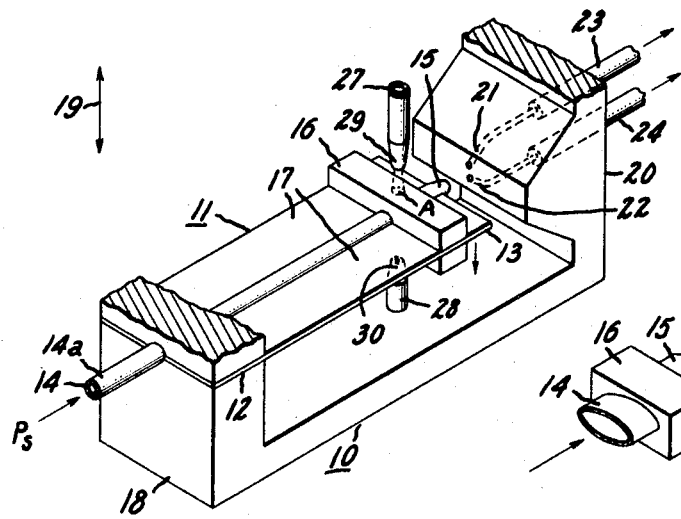
Fig. 1a.
Fig. 1b.
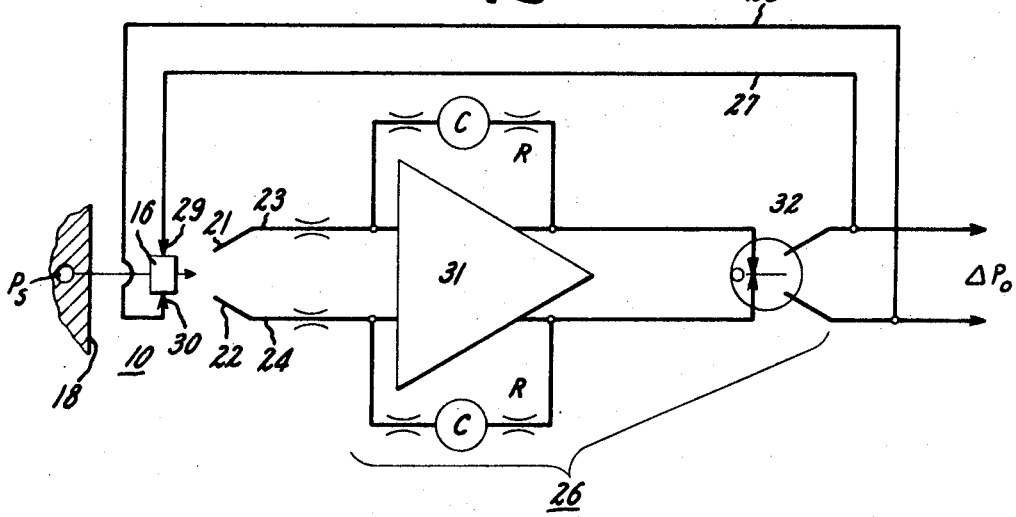
Fig. 2.
Inventors:
Jeffrey N. Shinn,
Carl G. Ringwall,
by Louis A. Moncha Inventors:
Jeffrey N. Shinn,
Carl G. Ringwall,
by Louis A. Moncha

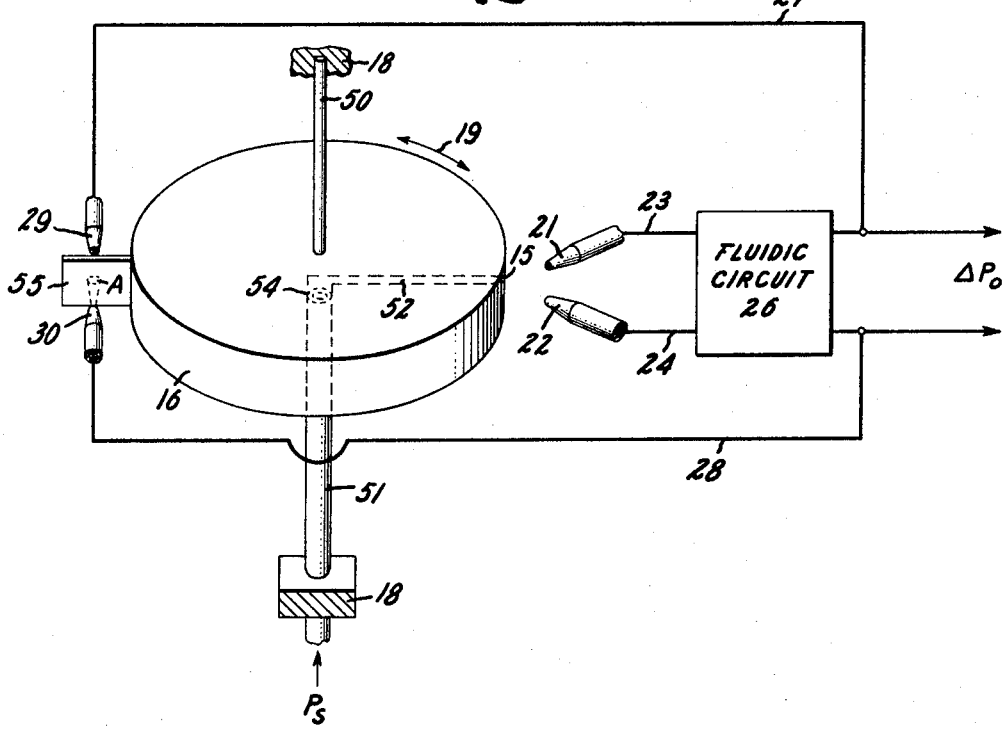
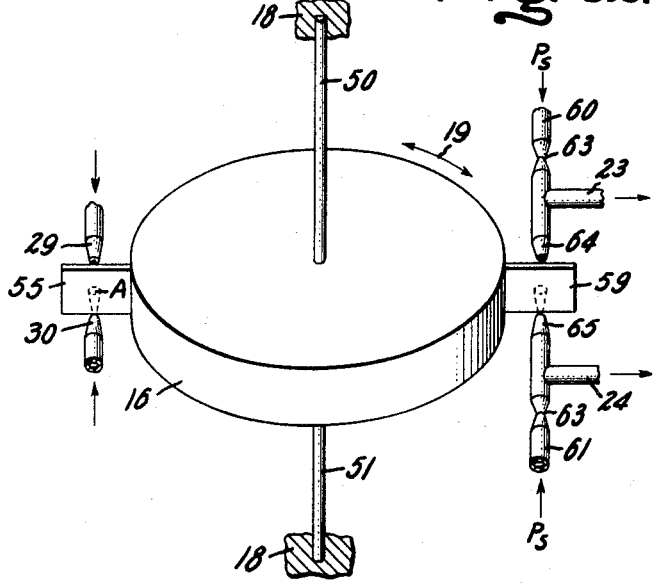

CLOSED-LOOP FLUIDIC ANALOG ACCELEROMETER

CROSS-REFERENCE DATA TO RELATED APPLICATION

This application is a division of our copending application, Ser. No. 642,115, filed May 29, 1967, entitled "Closed-Loop Fluidic Analog Accelerometer".

A concurrently filed U.S. Pat. application, Ser. No. 871,177, inventors R.A. Kantola and W.A. Boothe, entitled "Open-Loop Fluidic Analog Accelerometer" is assigned to the same assignee as the present invention and discloses and claims an open-loop embodiment of the subject closed-loop fluidic analog accelerometer.

Our invention relates to a fluidic type of accelerometer providing an analog output, and in particular, to a friction-free, closed-loop, fluidic accelerometer having a flexure-mounted means for sensing linear or angular motion acceleration to thereby provide a highly reliable accelerometer.

Accelerometers are devices for sensing the magnitude of particular acceleration events and find typical application in guidance and navigation systems for high performance aircraft in which their output is applied to other mechanisms for further computational or control functions, or for direct reading of the acceleration event. Prior art accelerometers are relatively complex structures having several moving parts subject to sliding motion and resultant frictional wear or other type of frictional motion which inherently causes degradation of the performance or actual failure of the accelerometer. The recently developed fluidics field employing no-moving parts devices known as fluid amplifiers offers promise of improved types of accelerometers having simplified structure and substantially unlimited lifetime. A prior art fluidic accelerometer employs a sliding piston supported by an air bearing in a cylinder filled with a suitable fluid for sensing acceleration by the motion of the piston responsive to the acceleration event, and fluid amplifier circuitry for merely amplifying the fluid signals picked off from the piston-cylinder arrangement. Although the air bearing reduces friction, it requires high precision, close-fitting parts which inherently are susceptible to contamination and warpage. Thus, the advantages of fluid amplifiers in their capability of withstanding extreme environmental conditions such as shock, vibration, nuclear radiation and high temperature and their no-moving parts feature which permits substantially unlimited lifetime cannot be utilized with this prior art accelerometer since the acceleration-sensing element fails long before any possible failure of the fluid amplifier circuitry associated therewith.

Therefore, one of the principal objects of our invention is to provide a new fluidic analog-type accelerometer having a friction-free acceleration sensing portion constructed of parts not requiring high precision to thereby utilize the full advantage of fluid amplifiers associated therewith.

Another object of our invention is to provide the accelerometer for sensing one-axis or two-axes linear motion acceleration.

A further object of our invention is to provide such accelerometer for sensing angular motion acceleration.

A still further object of our invention is to provide a closed-loop fluidic accelerometer to obtain null-type operation.

Briefly summarized, our invention is a new closed-loop fluidic analog-type accelerometer providing null-type operation. The sensor element of the accelerometer is comprised of a spring-mass device in the form of a flexure-mounted inertial mass responsive to the acceleration event which may be of the linear or angular motion type. In the case of the linear motion accelerometer, the spring-mass device comprises a hollow, elongated spring member of the cantilever beam type having a first end rigidly fixed in position about which the spring member flexure occurs, and a second unsupported end upon which the acceleration-sensitive inertial mass is mounted and rigidly attached thereto. The hollow portion of the spring member serves as a fluid passage wherein the fixed end thereof is supplied with a pressurized fluid and a fluid jet issues from the mass-mounted end. A pair of spaced fluid receivers are positioned coplanar with a selected axis along which the spring member is constrained to flex such that the fluid jet issuing therefrom is directed midway between the receivers in the nonflexed state of the spring member and is distributed between the receivers in a proportion varying with the magnitude of the acceleration event along the selected axis. The analog fluid signal developed by the differentially pressurized fluid recovered in the two receivers is supplied to fluid amplifier circuitry to provide high gain in the loop comprising the spring-mass device, receivers, fluid amplifier circuitry and a negative feedback circuit to obtain closed-loop, null-type operation of the accelerometer, and insensitiveness to changes in pressure of the fluid supplied to the hollow spring member. The negative feedback is obtained by directing the amplified fluid signal in negative feedback jet form against the acceleration-sensitive mass. The fluid amplifier circuit may also provide a lead-lag frequency response characteristic for stabilization of the closed-loop accelerometer. One-axis linear motion acceleration is sensed by construction of the spring member for stiffness in a lateral direction such that the only flexure is coplanar with the selected axis determined by the position of the fluid receivers. Two-axis linear motion acceleration is sensed by providing a second pair of fluid receivers positioned coplanar with a second selected axis generally perpendicular to the first axis associated with the first pair of receivers and a associated second fluid amplifier circuit and negative feedback circuit. The angular motion accelerometer embodiment of our invention comprises a cylindrical acceleration-sensitive mass attached along its longitudinal axis to two torsional spring members rigidly fixed in position at their far ends such that the cylindrical mass is subject to rotation in the presence of an angular acceleration event. A fluid jet in communication with the cylindrical mass is sensed by two receivers for developing a differentially pressurized analog fluid signal representing the magnitude of the angular motion acceleration event in a manner similar to that of the one-axis linear motion acceleration sensor. Fluid amplifier circuitry and a negative feedback circuit are also provided for obtaining null-type operation of our angular motion accelerometer.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawings wherein like parts in each of the several figures are identified by the same reference character, and wherein:

FIG. 1 is a perspective view, partly in section, of two embodiments of the acceleration-sensitive portion of a one-axis linear motion accelerometer constructed in accordance with our invention;

FIG. 2 is a schematic diagram of the one-axis linear motion accelerometer partially illustrated in FIG. 1;

FIG. 5 illustrates two embodiments of the acceleration-sensitive portion of an angular motion accelerometer constructed in accordance with our invention.

Figure 3:
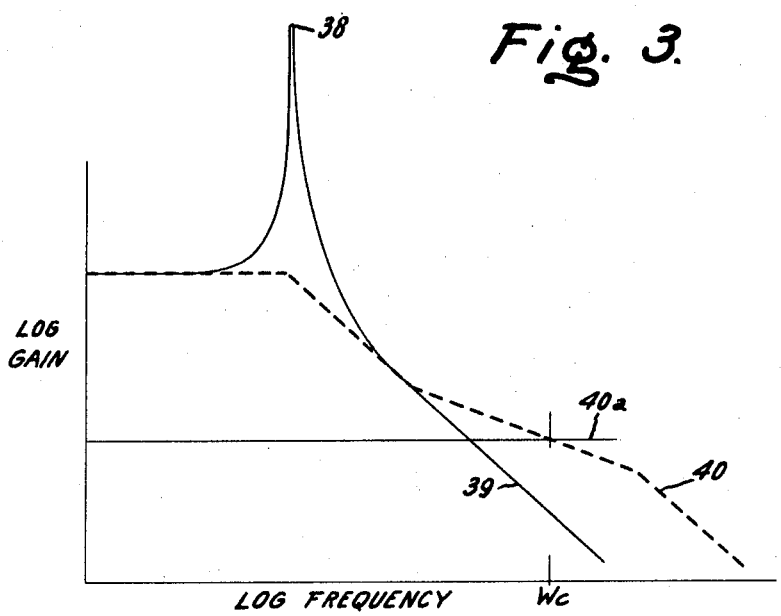
FIG. 3 is a typical Bode diagram representation of the frequency response characteristics for the accelerometer of FIG. 2.

Referring now to the drawings, in FIG. 1a there is shown, partly in section, a one-axis linear motion acceleration sensor 10 comprising the spring-mass, receiver and feedback portion of our closed-loop linear motion fluidic analog accelerometer. The spring-mass and receiver portion, which is common with the open-loop accelerometer described in the hereinabove-noted concurrently filed patent application, Ser. No. 871,177, will first be described. The spring-mass device is in the form of a flexuren mounted inertial mass comprising a resiliently flexible, elongated body 11 of the cantilever beam type having a first end 12 thereof rigidly fixed in position and a second unsupported end 13 upon which a body comprising an acceleration-sensitive (inertial) mass 16 is mounted and rigidly attached thereto. Bodies 11 and 16 may be distinct or one integral body. Body 11, hereinafter also described as a spring member, is provided with a hollow center portion running longitudinally of the spring member to form a fluid passage 14 therethrough. Body 16 may have any of a number of forms, but preferably is symmetrical about the plane of motion. A first end 14a of the fluid passage is adapted for connection by any suitable means to a source $P_s$ of fluid pressurized above ambient, and which may be a liquid or gas including air. The second end 15 of fluid passage 14 is in the form of a fluid flow restrictor or nozzle for generating a jet of the pressurized fluid which issues in a straight path aligned with the longitudinal axis of passage 14 in the region of the second end 15 thereof. Mass 16 is positioned in a plane perpendicular to the axis of fluid passage 14 when spring member 11 is in its nonflexed state and may be positioned in proximity with the second end 13 thereof, as illustrated, or at the very extreme end and integral therewith. For the case of the one-axis linear motion acceleration sensor, spring member 11 further includes a fin structure 17 integral with the hollow member 14 and mass 16, and is also rigidly fixed in position at the supported end 12 to provide stiffness in the lateral direction such that spring member 11 is constrained to be resiliently flexible as a cantilever beam along only a single axis perpendicular to the plane including fin member 17 in the nonflexed state of spring member 11. It is appreciated that the unsupported end 13 of member 11, and thus also mass 16, are constrained to move in a path which is a segment of an arc at whose null point the tangent to the path is in the direction along the axis in which acceleration is to be sensed, however, the degree of movement of unsupported end 13 and mass 16 is relatively small and spring member 11 is of elongated form such that as a good approximation the movement can be considered to be linear along the sensitive axis.

A housing for supporting the spring-mass device is a structurally rigid open frame member 18 rigidly fixed in position, such as by attachment to an aircraft structure subject to the external acceleration event being sensed, and oriented preferably such that the nonflexed state of spring member 11 is perpendicular to the axis of the single-axis linear motion acceleration event being sensed. Thus, in the illustration of FIG. 1a, frame 18 is positioned such that spring member 11 in the nonflexed state is oriented perpendicular with respect to the linear motion acceleration axis indicated by arrows 19. Member 11 is resiliently flexible about the supported end 12 in response to the linear acceleration event 19 wherein "resiliently flexible" is defined as the characteristic of member 11 flexing in the manner of a loaded cantilever beam in response to the acceleration event and returning to its nonflexed state in a subsequent absence of the acceleration. Frame 18 includes a second portion 20 for containing two spaced fluid receivers 21 and 22 positioned coplanar with the selected axis 19 and downstream of nozzle 15 such that in the nonflexed state of member 11 the fluid jet issuing from nozzle 15 is directed midway between the two receivers to thereby provide equal pressurized fluid signals in two fluid passages 23 and 24 which are connected to the outputs of receivers 21 and 22, respectively. The distance between the nozzle end 15 and downstream receivers 21, 22 determines the sensitivity (gain) of the acceleration sensor and such distance may be in the range of 1 to 20 times the smallest nozzle exit dimension. Within this range of spacings, the fluid jet is assumed to have minimum divergence in its path from the nozzle to the receivers, and the sensitivity increases with decreased nozzle-to-receiver spacing. Thus, in the absence of an acceleration event having at least a component along axis 19, the differentially pressurized fluid signal developed between passages 23 and 24 by the fluid pressure recovered in the receivers is zero. Passages 23, 24 and all the other fluid passages interconnecting elements of our accelerometer are of circular cross section, or other shapes as desired, constructed of a material compatible with the fluid medium employed. It is noted that none of the elements of the accelerometer are constructed as high precision parts.

Now assume that a linear motion acceleration event or component thereof develops along the indicated axis 19. Under this condition of acceleration which is assumed a linear motion acceleration, although it is recognized that a tangential component of angular motion acceleration can also be sensed, spring member 11 flexes in the manner of a loaded cantilever beam, and in particular, the unsupported end 13 of member 11 flexes due to the mass-acceleration force $F = ma$ being developed by mass ($m$) 16 accelerating along axis 19 in a direction, relative to frame 18, opposing the external acceleration event. This mass-acceleration force is opposed by the resiliency (spring rate) force of member 11 tending to return mass 16 to its null (zero acceleration) position, and the steady-state position of mass 16 in the open-loop accelerometer is determined by a balance of these forces. The magnitude of the displacement of end 13 (and mass 16) from its nonflexed (null) position is directly proportional in a linear relationship to the magnitude of the acceleration even along axis 19. In the event of a constant acceleration event, member 11 attains the state of flexure proportional to the magnitude of the acceleration and remains in such state for the duration of the constant acceleration. The motion of mass 16 from its null position to a steady-state position displaced from the null corresponding to a constant acceleration even may be somewhat oscillatory or without any overshoot depending upon the mechanical damping provided in the spring-mass device or the stabilizing provided in a fluid amplifier circuit to be described hereinafter. A mechanical damping factor as small as 0.10 or smaller for the structure illustrated in FIG. 1a is preferably employed in our closed-loop accelerometer. The mass of hollow member 14 and fin members 17 is made as small as possible, such that the primary acceleration-sensitive body, mass 16, has a mass greater than the total mass of members 14 and 17 by a ratio of at least 5:1. Although the cross section of the fluid passage within hollow member 14 is illustrated as being circular, it may be of other shapes such as rectangular or elliptical, and, as illustrated in FIG. 1b, the elliptical cross section of hollow member 14 may be sufficiently stiff laterally to omit the need for providing fin members 17 as in the case of the FIG. 1a embodiment. In addition, the circular shaped receivers indicated in FIG. 1a may also have other shapes such as the rectangular illustrated in enlarged nozzle-receiver FIG. 1b. A center vent passage 25 may also be provided, if desired, intermediate receivers 21 and 22.

A specific example of the dimensions of a one-axis linear motion accelerometer sensor having as the spring member 11 a hollow reed of rectangular cross section, and constructed of 0.005 inch steel follows: The reed is 2 inches long having outside dimensions of 0.030 inch (height) by 0.210 inch (width). The nozzle-to-receiver spacing is 0.200 inch, equal to 10 times the reed inside height dimension. The receivers each have a height dimension equal to the inside height dimension of the reed, and are spaced apart by a center vent as illustrated in FIG. 1b, having a dimension equal to one half a receiver height dimension. The weight of mass 16 is approximately 0.03 pound and the mass of the reed alone is approximately 5 percent of this amount. The deflection of the jet at the receivers for this specific open-loop sensor is 0.00905 inch per gravitational unit of acceleration (inch/G) wherein G = 32.2 feet/second$^2$, and the output differential pressure change per unit of deflection varies linearly with supply pressure and is 16.5 psid/inch/psi wherein psid is pounds per square inch differential. Thus, the open-loop sensor sensitivity is 0.281 psid/G/psi. The sensitivity of our closed-loop accelerometer, on the other hand, is a function solely of the weight of mass 16 and feedback nozzle geometry to be described hereinafter whereas the speed of response is primarily a function of the loop gain for loop gains approaching infinity.

The acceleration sensor hereinabove described is the open-loop fluidic analog accelerometer described and claimed in the hereinabove-noted concurrently filed patent application.

The above-described open-loop fluidic accelerometer is a satisfactory device for sensing acceleration but the flexure of spring member 11 and attendant movement of mass 16 may become relatively large for acceleration events having exceptionally large magnitudes, resulting in a nonlinear relationship between the position of mass 16 from null and the differential pressure signal developed in response thereto. The degree of mass 16 movement may, of course, be decreased by decreasing the weight of mass 16 or increasing the stiffness of member 11 along axis 19 at some expense in sensor sensitivity. The linearity and scale factor (sensitivity in psid/G) of the open-loop accelerometer is sensitive to changes in factors such as supply pressure, fluid amplifier null drift, spring rate, etc.

These problems of the open-loop accelerometer are remedied by our invention in supplying high gain-negative feedback to the spring-mass device to obtain a closed-loop, fluidic, analog accelerometer having a null-type mode of operation. The use of high loop gain results in a feedback signal which essentially nulls the flexure of tHe spring member 11 in the presence of a steady-state acceleration event thereby resulting in the null-type mode of operation wherein the displacement of mass 16 from the null point is inversely proportional to the gain of the control loop (loop gain very high.) For loop gain approaching infinity, the nulling force must equal the acceleration force at the null conditions, since the nulling force is the product of the differential nulling pressure and the effective (feedback) nozzle areas (which are fixed). The nulling differential pressure thus is exactly proportional to acceleration (for high loop gains) under steady-state conditions. Dynamic accelerations also can be sensed, with our closed-loop arrangement, up to the response capabilities of the control loop.

Our closed-loop accelerometer is illustrated schematically in FIG. 2 wherein fluidic circuitry for amplifying the differential signal developed across receivers 21, 22 and for stabilizing the closed-loop response is indicated as a whole by numeral 26. Circuit 26 includes a high-gain fluidic operational amplifier 31 comprising a plurality of serially connected analog-type fluid amplifiers with negative feedback which may readily obtain a gain of 1,000 with state of the art fluid amplifiers. A fluidic power amplifier 32 is also preferably employed to develop sufficient fluid power for supplying both the feedback circuit and external load supplied by the differentially pressurized output fluid signal $\Delta P_o$.

The negative feedback circuit comprises a pair of fluid passages 27 and 28 respectively connected from the output of our accelerometer indicated as $\Delta P_o$ to two opposed nozzles 29 and 30 aligned with axis 19 along which member 11 flexes. Nozzles 29, 30 are directed against opposite sides of mass 16 in negative feedback relationship such that the flexure of member 11 and position of mass 16 is essentially nulled in the presence of an acceleration event. The characteristic of our accelerometer of being insensitive to changes in fluid supply pressure and other factors can be appreciated from the following analysis: The mass-acceleration force $F = ma$ developed by mass 16 being subjected to the acceleration event "$a$" along axis 19 is counteracted by the force produced by the feedback jets emitted from nozzles 29 and 30 impinging upon mass 16. Assuming that the area of jet impingement on mass 16 is equal to the cross section of the jet issuing from the feedback nozzle, and is designated A, then the feedback force = $\Delta P_o A$, and a balance of the forces on mass 16 is of the form $ma - \Delta P_o A = \Delta P_o \, 1/G_a$ where $G_a$ is the fluid amplifier gain and $\Delta P_o \, 1/G_a$ is the term conventionally described in servomechanism theory as the error (force) determined to an extent by the hereinbefore described "resiliency force" which in the closed-loop embodiment is much smaller than in the open-loop embodiment. This force balance equation reduces to $$\Delta P_0 = \frac{ma}{A + \frac{1}{G_a}}$$

and since the amplifier gain is made sufficiently large such that $1/G_a$ is much less than A, it is seen that the output differential pressure signal $\Delta P_o$, and hence the operation of our closed-loop accelerometer is insensitive to changes in loop gain. Factors which affect loop gain are changes in fluid supply pressure ($\Delta P_s$), amplifier null drift, spring rate, contamination effects. Thus, it is evident that the closed-loop embodiment is insensitive to changes such as in fluid supply pressure.

FIG. 3 is a Bode diagram illustrating the frequency response characteristics of our accelerometer. The spring-mass member 11, 16 has very little damping as indicated by the resonant peak 38 of the open-loop plot. The low frequency spring-mass resonance results in greater sensor sensitivity (gain), that is, greater movement or deflection per unit acceleration. An accelerometer comprising merely the acceleration sensor 10, the negative feedback network (passages 27, 28 and nozzles 29, 30), and the high gain of fluid amplifier circuitry 26 would provide an open-loop Bode plot of the form illustrated by solid line 39 resulting in unstable operation upon closing the feedback loop. A fluidic circuit providing a lead-lag type frequency response, resulting in an overall characteristic as illustrated by dashed line 40, is therefore employed for stabilizing the closed loop and providing damping of the spring-mass member 11, 16. The stabilized open-loop frequency response curve 40 crosses the feedback characteristic curve 40a in one particular example at a frequency $w_c$ of approximately 12 cycles per second wherein the spring-mass member has a natural resonant frequency somewhat lower. The stabilizing lead-lag frequency response characteristics is obtained by adding fluid capacitors C and resistors R of appropriate value in the negative feedback of operational amplifier 31 to obtain desired values of impedance in the input and feedback circuits of the operational amplifier for obtaining the desired lead-lag characteristic.

Figure 4B:
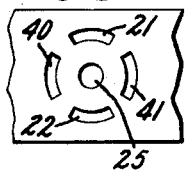
FIG. 4 is a two-axis embodiment of the linear motion accelerometer of FIGS. 1 and 2 and further illustrates enlarged views of two other types of fluid receivers that may be employed.
Figure 4A:
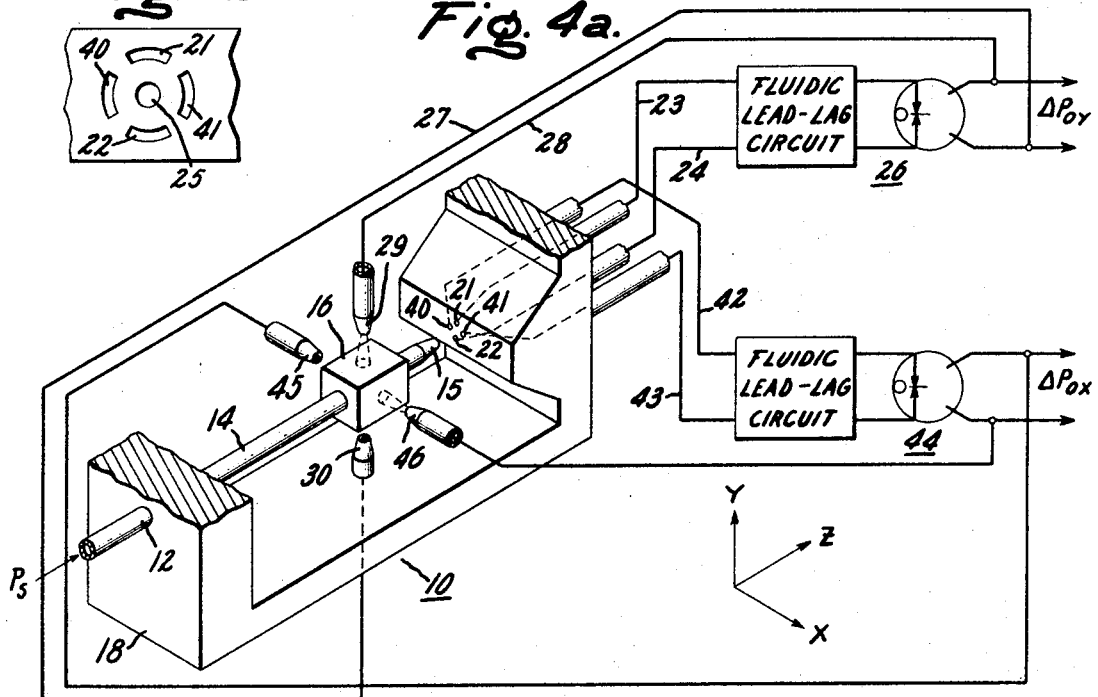

The single-axis fluidic accelerometer illustrated in FIGS. 1 and 2 may be converted to a two-axis linear motion accelerometer as illustrated in FIG. 4a in the following manner. The fin portion 17 for rendering spring member 11 stiff in the lateral direction is omitted and a resiliently flexible tube 14 preferably having a circular cross section is utilized as the spring member. The first end 12 of tube 14 is rigidly supported within portion 18 of the frame housing in its passage through the wall thereof such that tube is equally resiliently flexible in all directions. Mass 16 is of cubicle form such that the surfaces thereof are readily adapted to receive the impact of the feedback jets. A second pair of spaced receivers 40 and 41 are positioned coplanar with a second selected axis herein designated $x$ which for purposes of exemplification is perpendicular to the first axis 19 herein designated $y$ along which the first pair of receivers 21 and 22 are positioned. The two pairs of receivers 21, 22 and 40, 41 are each equally spaced and define the two axes $x$, $y$ along which an external acceleration event is to be sensed. The four receivers are oriented such that in the nonflexed (null) state of spring member 14, the fluid jet issuing from nozzle 15 is directed centrally of the arrangement of four downstream receivers and distributed equally there among, or vented to a central vent (not shown), to provide equal pressurized fluid signals in the four passages 23, 24, 42, 43 connected to the outputs of the receivers. Thus, in the absence of an acceleration event having at least a component within the $x$-$y$ plane, the $x$-and $y$-axis differential pressurized fluid signals developed between passages 42–43 and 23–24, respectively, are zero. A fluidic circuit 26 which may be of the same type illustrated in FIG. 2 providing high gain and lead-lag frequency response characteristics and a fluid amplifier power stage is connected to fluid passages 23 and 24 to provide a differentially pressurized $y$-axis output fluid signal $\Delta P_{oy}$. In like manner, fluid passages 42 and 43 are connected to a second fluidic circuit 44 identical to circuit 26 to develop at the output thereof a differentially pressurized $x$-axis output fluid signal $\Delta P_{ox}$. The $y$-axis output signal $\Delta P_{oy}$ is supplied in negative feedback relationship to the y-axis feedback nozzles 29 and 30 for obtaining null-type operation along the y-axis as in the case of FIG. 1. In like manner, the x-axis output signal $\Delta P_{ox}$ is supplied in negative feedback relationship to a second pair of aligned, opposed nozzles 45 and 46 for obtaining the null-type operation along the x-axis of member 14 flexure. As illustrated in FIG. 4a, the y-axis feedback nozzles issue fluid jets impacting on the upper and lower surfaces of mass 16 whereas the x-axis nozzles 45 and 56 issue jets impacting on the two side surfaces thereof.

Figure 4C:
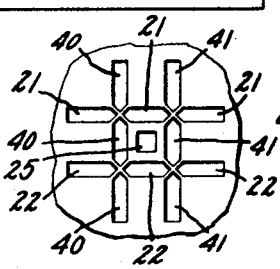

Although the fluid receivers 21, 22, 40 and 41 in FIG. 4a are illustrated as being of circular shape, they may also have the shape illustrated in FIG. 4b, a sector of a ring, the advantage of this shape being that a lower output fluid impedance is obtained for supplying greater output flow since the receivers intercept a greater portion of the fluid jet. A third arrangement of fluid receivers is illustrated in FIG. 4c comprising a cruciform arrangement of 12 receivers. The twelve receivers are in four groups, each comprising three receivers interconnected at their outputs for supplying the four fluid passages leading to the two fluidic amplification-stabilization circuits 26, 44. The interconnected receivers in each group are indicated by the numerals designating the four receivers in FIGS. 4a and 4b. Center vents 25 can be used with each of the receiver arrangements illustrated in FIGS. 4b and 4c, if desired.

Fluidic analog accelerometers for sensing angular motion acceleration and being friction-free in operation and constructed of parts not requiring high precision are illustrated in FIGS. 5a and 5b. In both of FIGS. 5a and 5b, as in the case of the linear motion accelerometer, the acceleration-sensitive portion of the accelerometer comprises a flexure-mounted inertial mass. In the case of our angular motion accelerometer, the inertial mass is a cylindrical body 16 of mass m rigidly attached to and supported along its longitudinal axis by the near ends of two aligned torsionally resilient members 50 and 51 having their far ends rigidly fixed in position to frame member 18. Torsionally resilient members 50 and 51 may comprise tubes of the type 14 illustrated in FIG. 4a, preferably proportioned for greater stiffness in bending than in torsion. Mass 16 thus undergoes a resiliently rotational motion about its axis in response to an angular motion acceleration vent 19 which occurs about such axis in a plane perpendicular or substantially perpendicular thereto.

Referring now in particular to FIG. 5a, mass 16 is provided with a hollow center portion 52 which forms a fluid passage preferably circular in cross section, although other shapes may also be utilized, extending along the longitudinal axis of mass 16 from the bottom end thereof to approximately the center and thence extending radially outward and terminating in a nozzle shape 15. A pair of spaced fluid receivers 21 and 22 are positioned in the plane of rotation of mass 16 and oriented such that in the null position of mass 16, wherein members 50 and 51 are in their torsionally nonflexed state, a fluid jet issuing from nozzle 15 is directed midway between the downstream two receivers to thereby provide equal pressurized fluid signals in two fluid passages 23 and 24 connected with the outputs of receivers 21 and 22, respectively. Torsionally resilient member 51, being hollow, also provides a fluid passage interconnecting passage 52 to a source of pressurized fluid $P_s$, passage 51 illustrated as being coupled in fluid-tight relationship with passage 52 in region 54. The hereinabove recited elements of the angular motion accelerometer form an open-loop accelerometer described and claimed in the above mentioned concurrently filed patent application.

The differentially pressurized fluid signal between passages 23 and 24 is supplied to the input of a fluidic circuit 26 which may be of the same type as illustrated in FIG. 2 to provide high loop gain, a lead-lag frequency response characteristic and a stage of power amplification. Feedback fluid passages 27 and 28 supply the differentially pressurized analog output signal $\Delta P_o$ to aligned feedback nozzles 29 and 30, respectively, and the high loop gain-negative feedback circuit obtains null-type operation similar to that explained with reference to FIG. 1. Feedback nozzles 29 and 30 are positioned in the plane of rotation of mass 16 and equally spaced from (under conditions of zero angular motion acceleration), and perpendicular with, a rigid member 55 protruding from mass 16 and rigidly fixed thereto in a position radially therewith. The operation of our angular motion accelerometer may be described as follows: Under conditions of zero angular motion acceleration, the pressures recovered in receivers 21 and 22 are equal such that the differentially pressurized fluid signal developed between passages 23 and 24, and the output differential pressure signal $\Delta P_o$ are both zero. Under this condition of zero angular acceleration, the feedback signals are also equal and the two feedback jets issuing from nozzles 29 and 30 and impinging upon area A on member 55 are of equal pressure magnitude to cause member 55 to remain motionless and equally spaced from nozzles 29 and 30. Under conditions of an angular motion acceleration of frame 18 along path 19, the acceleration torque due to mass 16 being subjected to rotational acceleration causes torsional spring members 50 and 51 to be flexed by twisting in the same direction as frame 18 accelerates but in an opposing direction relative to the null point midway between the receivers. The flexure of members 50, 51 and relative rotation of mass 16 is of magnitude directly proportional in a linear relationship to the magnitude of the angular acceleration of frame 18 along path 19. Counteracting the acceleration torque is a negative feedback torque produced by the now unequally pressurized feedback jets (due to $\Delta P_o$ not equal to zero) impinging upon member 55. A balance of the acceleration torque, resiliency torque, and torque produced by the feedback jets impinging on member 55 produces an angular motion accelerometer insensitive to pressure changes in fluid supply $P_s$ as in the manner of our linear motion accelerometer.

Referring now to FIG. 5b, there is shown a second embodiment of the angular motion acceleration-sensing portion of our accelerometer illustrated in FIG. 5a. The distinction between the two embodiments is the means for supplying the differentially pressurized fluid signal to the input of passages 23 and 24 which are connected to the fluidic circuit 26. In the FIG. 5b embodiment, torsionally resilient member 51 does not provide the additional function of a fluid passage as in the case of the FIG. 5a embodiment, nor is there any need for a hollow portion within mass 16. In the FIG. 5b embodiment, a pair of fluid passages 60 and 61 supplied from a source of pressurized fluid $P_s$, each include a fluid flow restrictor 63 and terminate in aligned nozzles 64 and 65, respectively, positioned within the plane of rotation of mass 16 and perpendicular with a second protruding member 59 rigidly fixed to mass 16 radially therewith. Nozzles 64, 65 are equally spaced from member 59 at the null position of mass 16. Fluid passages 23 and 24 which are connected to the input of fluidic circuit 26 (not shown) are connected to passages 60 and 61, respectively, intermediate the fluid flow restrictor 63 and nozzle ends thereof. The feedback nozzles 29 and 30 are positioned in the same relationship as in FIG. 5a and supplied with the output signal $\Delta P_o$ in the negative feedback relationship to obtain the insensitiveness to changes in fluid supply pressure characteristic. The operation of the acceleration sensor in FIG. 5b may be briefly described as follows: Under conditions of zero angular acceleration, nozzles 64 and 65 are equally spaced from member 59 and thus the back pressure developed in passages 23 and 24 due to the effect of the fluid jets impinging upon member 59 in the presence of fluid flow restrictors 63 is equal in each of passages 23 and 24 such that the differential signal therebetween is zero. Under conditions of an angular motion acceleration, mass 16 undergoes a rotational motion about its axis proportional to the magnitude of the external acceleration in the plane of mass 16, resulting in spring members 50 and 51 developing a flexure torque in the same direction as the external angular motion acceleration event 19, but in an opposing direction relative to the null point. The rotational motion of mass 16 causes member 59 to more closely approach one of the nozzles 64 and 65. Thus, assuming that the external angular motion acceleration event 19 is in a clockwise direction, the rotational motion of mass 16 is counterclockwise relative to the frame 18 thereby developing a larger magnitude back pressure in passage 23 and a correspondingly smaller back pressure in passage 24. This difference in back pressures is the differentially pressurized fluid signal applied to fluidic circuit 26 and results in an amplified output signal $\Delta P_o$ which is supplied in negative feedback relationship to nozzles 29 and 30. The rotational motion of mass 16 causes member 55 to more closely approach feedback nozzle 30 and the output signal $\Delta P_o$, being in negative feedback relationship, supplies the higher pressure signal to nozzle 30 and the lower pressure signal to nozzle 29 thereby rotating mass 16 back toward its null position to obtain the null-type mode of operation.

From the foregoing description, it can be appreciated that our invention makes available a new closed-loop fluidic analog accelerometer which is friction-free in operation, and is not constructed of high precision, close-fitting parts such that the full advantage of the highly reliable fluid amplifiers used in our apparatus may be utilized. Our accelerometer may be of the one-axis or two-axis linear motion accelerometer type or angular motion accelerometer type, each providing an analog-type fluid output signal. The high loop gain of the closed-loop arrangement obtains a null-type mode of operation whereby the accelerometer is essentially insensitive to changes in pressure of the fluid supplied to the accelerometer. The acceleration-sensitive portion of our accelerometer, being comprised of a flexure-mounted inertial mass responsive to the acceleration event, is of relatively simple construction and provides a highly reliable device.

Having described several embodiments of our closed-loop fluidic analog accelerometer, it is believed obvious that modification and variation of our invention is possible in the light of the above teachings. Thus, other fluid amplifier circuitry in the form of a rate circuit to provide phase lead may be utilized in fluidic circuit 26, as desired, to obtain stabilization of the closed loop. Finally, it should be obvious that various shapes of the spring members and inertial masses other than that illustrated may also be employed and that such elements may be constructed from a variety of materials dictated by the environment. It is, therefore, to be understood that changes may be made in the particular embodiments of our invention as described which are within the full intended scope of the invention as defined by the following claims.

What we claim as new and desire to secure by Letters Patent of the United States is:

1. A closed-loop fluidic analog-type accelerometer comprising a low friction torsional spring-mass device rotational about an axis for sensing a selected angular motion acceleration event and generating an analog-type pressurized fluid signal proportional to the magnitude of the sensed acceleration event wherein an inertial mass portion of said spring-mass device remains in a predetermined null position in the absence of the acceleration event, the force resulting from said mass rotatably accelerating in response to the acceleration event causing flexure of a torsional spring portion of the spring-mass device and rotary motion of the acceleration-sensitive mass relative to the null position in a direction opposing the selected acceleration event, the torsional spring portion constrained for flexure in torsion whereby the rotational motion of said mass is also constrained to be in the plane of rotation for producing an angular motion accelerometer sensitive to external angular motion acceleration events within such plane, analog-type fluid amplifier means in communication with said spring-mass device for high-gain amplification of the analog fluid signal generated by said spring-mass device, and means in communication with said fluid amplifier means for providing the amplified fluid signal to the inertial mass portion of said spring-mass device in negative feedback relationship to obtain a null-type mode of operation of said accelerometer wherein the spring flexure is substantially reduced and said mass is rotatably movable back toward its null position, the steady-state angular displacement of said mass from the null position, being inversely related to the loop gain of said accelerometer for a constant magnitude angular motion acceleration event, the high-gain amplification and negative feedback rendering the response of the accelerometer substantially insensitive to changes in pressure of a fluid supplied to said inertial mass portion and which results in the generation of the analog fluid signal.

2. The fluidic accelerometer set forth in claim 1 wherein
said torsional spring-mass device is provided with means passing through the torsional spring portion and inertial mass portion for issuing a pressurized fluid jet from the inertial mass portion,
and further comprising a pair of spaced fluid receivers positioned in the plane of rotation of said acceleration-sensitive mass and oriented downstream of said fluid jet issuing-means whereby in the null position of said acceleration-sensitive mass the fluid jet is directed midway between said receivers and in the presence of the acceleration event in the plane of rotation the fluid jet is distributed between said receivers in a proportion determined by the loop gain and magnitude of the external angular motion acceleration event.

3. The fluidic accelerometer set forth in claim 1 wherein
said torsional spring-mass device is provided with a protruding member for intercepting fluid jets on both sides thereof,
and further comprising means for issuing two pressurized fluid jets in intercepting relationship with said protruding member for developing back pressures within said fluid jet issuing means, said fluid jet issuing means positioned in the plane of rotation of said acceleration-sensitive mass and oriented whereby in the null position of said acceleration-sensitive mass the protruding member is equally spaced from the jet issuing ends of said fluid jet issuing means and in the presence of the acceleration event in the plane of rotation the protruding member is unequally spaced therefrom in a proportion determined by the loop gain and magnitude of the external angular motion acceleration event.

4. A closed-loop fluidic analog-type accelerometer having no close-fitting, sliding-motion parts and comprising an aligned pair of resiliently flexible hollow members flexible in torsion about their longitudinal axes, said hollow members having far-spaced first ends rigidly supported in position about which the flexure occurs and near-spaced second ends, an acceleration-sensitive mass for sensing an external angular motion acceleration event and comprising a cylindrical body rigidly connected at its two ends along its longitudinal axis to the near-spaced ends of said hollow members whereby said body remains in a predetermined null position in the absence of the external angular motion acceleration event and is rotatably movable therefrom in the presence of such external acceleration event, means for supplying pressurized fluid to said cylindrical body, means rigidly fixed in position to a structure subject to the external acceleration event and comprising a first portion for providing the rigid support for the far-spaced first ends of said hollow members about which the torsion occurs, and a second portion having means coplanar with the axis of rotation of said body for sensing the fluid supplied to said body in a proportion varying with the magnitude of the acceleration event to thereby generate an analog-type pressurized fluid signal representing the component of the external angular motion acceleration event in the plane of such rotation and proportional to the magnitude thereof, analog-type fluid amplifier means having an input in fluid communication with said second portion means for providing high gain amplification of the analog signal in differentially pressurized form, and a pair of fluid passages having first ends thereof connected to the output of said fluid amplifier means and second ends thereof connected to a pair of aligned opposed nozzles equally spaced from a protruding member connected to said body in the null position thereof for directing jets of the feedback fluid signal in intercepting relationship with said protruding member in negative feedback relationship resulting in a negative feedback torque moving said body back toward its null position, the high-gain negative feedback accelerometer rendering the response thereof substantially insensitive to changes in pressure of the fluid supplied to said body, said fluid amplifier means also providing stabilization of the high-gain closed loop comprising said flexible hollow members, cylindrical body, second portion means, fluid amplifier means and pair of fluid passages.

* * * * *